US008078593B1

(12) United States Patent
Ramarao

(10) Patent No.: US 8,078,593 B1
(45) Date of Patent: Dec. 13, 2011

(54) DICTIONARY ARCHITECTURE AND METHODOLOGY FOR REVISION-TOLERANT DATA DE-DUPLICATION

(75) Inventor: Karempudi V. Ramarao, San Ramon, CA (US)

(73) Assignee: Infineta Systems, Inc., San Jose, CA (US)

( * ) Notice: Subject to any disclaimer, the term of this patent is extended or adjusted under 35 U.S.C. 154(b) by 354 days.

(21) Appl. No.: 12/549,787

(22) Filed: Aug. 28, 2009

Related U.S. Application Data

(60) Provisional application No. 61/092,740, filed on Aug. 28, 2008.

(51) Int. Cl.
G06F 17/00 (2006.01)
G06F 7/00 (2006.01)

(52) U.S. Cl. ........................................ 707/692; 707/791

(58) Field of Classification Search .................. 707/791, 707/692
See application file for complete search history.

(56) References Cited

U.S. PATENT DOCUMENTS

| | | |
|---|---|---|
| 6,667,700 B1 | 12/2003 | McCanne et al. |
| 6,904,430 B1 | 6/2005 | Livshits |
| 6,925,467 B2 | 8/2005 | Gu et al. |
| 7,200,604 B2 | 4/2007 | Forman et al. |
| 7,281,006 B2 | 10/2007 | Hsu et al. |
| 7,305,532 B2 | 12/2007 | Zhu et al. |
| 7,504,969 B2 | 3/2009 | Patterson et al. |
| 7,523,098 B2 | 4/2009 | Hirsch |
| 7,930,559 B1 * | 4/2011 | Beaverson et al. ........... 713/193 |
| 7,962,520 B2 * | 6/2011 | Patterson et al. ............. 707/791 |
| 2004/0139072 A1 | 7/2004 | Broder et al. |
| 2004/0187075 A1 * | 9/2004 | Maxham et al. .............. 715/234 |
| 2005/0131939 A1 | 6/2005 | Douglis et al. |
| 2005/0210043 A1 | 9/2005 | Manasse |
| 2006/0047855 A1 | 3/2006 | Gurevich et al. |
| 2006/0059207 A1 | 3/2006 | Hirsch et al. |
| 2006/0112148 A1 | 5/2006 | Jennings et al. |
| 2007/0085716 A1 | 4/2007 | Bar-Yossef et al. |
| 2008/0005141 A1 | 1/2008 | Zheng et al. |
| 2008/0005201 A1 | 1/2008 | Ting et al. |
| 2008/0010278 A1 | 1/2008 | Kenci et al. |
| 2008/0098083 A1 | 4/2008 | Shergill et al. |
| 2008/0144079 A1 | 6/2008 | Pandey et al. |
| 2008/0244172 A1 | 10/2008 | Kano |
| 2009/0063528 A1 | 3/2009 | Yueh |
| 2009/0063795 A1 | 3/2009 | Yueh |

(Continued)

OTHER PUBLICATIONS

Andrei Z. Broder, "Identifying and Filtering Near-Duplicate Documents," Compaq's System Research Center, Palo Alto, California, 1998; 10 pages.

(Continued)

*Primary Examiner* — Sathyanarayan Pannala
(74) *Attorney, Agent, or Firm* — Charles Shemwell

(57) ABSTRACT

Redundant data is removed from a volume of data by partitioning the volume of data into fixed-length input segments and, for each of the input segments, traversing nodes of a search tree in accordance with the value of a fixed-size portion of the input segment to determine if the search tree contains a pointer to a matching fixed-sized portion of a segment within a dictionary. If the search tree contains the pointer, the input segment is compared with the segment within the dictionary pointed to by the pointer, and a token representative of the segment within the dictionary is substituted for at least part of the input segment determined to match the segment within the dictionary.

18 Claims, 6 Drawing Sheets

U.S. PATENT DOCUMENTS

2009/0089483 A1   4/2009   Tanaka et al.

OTHER PUBLICATIONS

Navendu Jain et al., "TAPER: Tiered Approach for Eliminating Redundancy in Replica Synchronization," FAST'05: 4th Usenix Conference on File and Storage Technologies, Austin, Texas, 2005 14 pages.

Punushottam Kulkarni, "Redundancy Elimination Within Large Collections of Files," University of Massachusetts, Amherst, MA, IBM, Dec. 22, 2003, 15 pages.

Athicha Muthitacharoen et al., "A Low-Bandwidth Network File System," MIT Laboratory for Computer Science and NYS Dept. of Computer Science, Banff Alberta, Canada, 2001 14 pages.

Andrei Z. Broder, "Some Application of Rabin's Fingerprinting Method," Sequences II: Mehods in Communications, Security and Computer Science, Palo Alto, California, 1993, 10 pages.

Uldi Manbar, "Finding Similar Files in a Large File System," University of Arizona, Dept of Computer Science, Tucson, Arizona, Oct. 1993, 11 pages.

Calicrates Policroniades et al., "Proceedings of the General Track: 2004 Usenix Annual Technical Conference," Usenix Association, Boston, MA, 2004, 15 pages.

Benjamin Zhu et al., "Avoiding the Disk Bottleneck in the Data Domain Deduplication File System," Fast '08: 6th Usenix Conference on File and Storage Technologies, Usenix Association, San Jose CA, Feb. 29, 2008, pp. 269-282.

\* cited by examiner (Prior-Art)

DICTIONARY ARCHITECTURE AND METHODOLOGY FOR REVISION-TOLERANT DATA DE-DUPLICATION

CROSS-REFERENCE TO RELATED APPLICATIONS

This application hereby claims priority to and incorporates by reference U.S. Provisional Application No. 61/092,740, filed Aug. 28, 2008 and entitled "Storage Architecture For Dictionary-Based Data Reduction."

TECHNICAL FIELD

The disclosure herein relates to data processing and more particularly to reducing transfer and/or storage of redundant data in a data processing system.

BACKGROUND

The amount of data being stored and transmitted in modern data processing networks is growing rapidly as Web 2.0 technologies and content-rich media proliferate. Increasing employee mobility and rising capabilities of end user systems (e.g. laptops, smartphones) also increase the demand for content storage and transmission, as do disaster recovery and enterprise globalization technologies, which frequently involve distribution of multiple copies of data over large geographical areas. At the same time, the cost and operational expense of maintaining network links and large pools of storage devices remains high.

A number of technologies have emerged to address the explosive demand for network bandwidth and storage capacity, including data reduction techniques such as caching, compression and de-duplication. Data de-duplication is of particular interest and involves dictionary-based reduction of extremely large volumes of data (e.g., terabytes or more) into smaller quantities of stored or transmitted data.

FIG. 1 illustrates a prior-art de-duplication engine 100 that produces a de-duplicated output data volume, Y, in response to an input data volume, X. Following the conventional approach, breakpoints are identified within the input data volume based on the data content itself, thereby dividing the input data volume into multiple content-defined segments. A hash index is computed for each segment and compared with the contents of a hash table. If a matching hash index is found within the table, a dictionary segment pointed to by the matching hash table entry is retrieved and compared byte for byte with the input data segment. If the dictionary segment and input data segment match, then a token associated with the dictionary segment is inserted into the output data volume in place of the input data segment, thus reducing the output volume relative to the input volume (if the segments do not match or no matching hash index is found, the input data segment may be added to the dictionary and the corresponding hash index added to the hash table to effect a dictionary update). A converse operation is performed at the transmission destination (or upon retrieval from mass storage media), indexing the dictionary using the token (a matching dictionary is maintained at the destination) to restore the original data segment within a recovered data volume.

One substantial drawback of the foregoing de-duplication scheme is the intensive computation required to identify the breakpoints and hash index. In a typical implementation, a "fingerprint" is computed for each byte of the input data volume—a calculation that generally involves a polynomial division over a range of data extending from the byte of interest—to determine whether the subject byte constitutes a breakpoint (e.g., fingerprint meets some predetermined criteria, such as '0's in some number of bit positions). The hash index computation is similarly carried out for each byte of the input data volume and may similarly involve a compute-intensive calculation. The computing demand is particularly onerous in de-duplication systems that employ "strong" or near-perfect hashing functions in an effort to avoid hash collisions (e.g., SHA-1, MD5 or the like). In general, the breakpoint identification and hash index computation are so demanding as to render the de-duplication operation impractical for high-bandwidth streaming data, thus requiring the data de-duplication operation to be executed offline for many important classes of applications.

The conventional approach is further plagued by dictionary "misses" that result from minor data modifications. Changing even a single byte within a segment will generally yield an entirely different hash index, particularly in applications that employ strong or near-perfect hashing, and thus produce a miss within the hash table (or worse, a hit within the hash table followed by a miss in the bytewise compare). Even more problematic is a modification within the region that produced a breakpoint in the original input data volume as the resulting breakpoint loss will cause a dictionary miss for both of the segments previously delineated by the breakpoint (i.e., one segment ended by the breakpoint and another segment begun).

BRIEF DESCRIPTION OF THE DRAWINGS

The disclosure herein is illustrated by way of example, and not by way of limitation, in the figures of the accompanying drawings and in which like reference numerals refer to similar elements and in which.

DETAILED DESCRIPTION

A revision-tolerant data de-duplication architecture that detects and accounts for minor modifications in a data volume is disclosed in various embodiments. In one embodiment, for example, instead of employing near-perfect or other strong hashing algorithms to compare segments of a data volume with dictionary contents, relatively small, fixed-length portions of an input volume, referred to herein as "handles" are compared with corresponding handles within dictionary entries. Upon identifying a handle match between the input volume and a dictionary entry, portions of the input volume abutting the matching input-handle are compared with portions of the dictionary entry abutting the matched dictionary-handle, progressing in this manner to determine the extent of the match between the data volume and the dictionary entry. Thus, the matched handles constitute an anchor at which the input data volume and dictionary entry may be, in effect, overlaid and compared to determine the extent of the match. By bootstrapping from the relatively small regions of matched data to larger regions of matched data up to the point where a non-equality is detected, incoming data may be wholly or partially matched to a dictionary entry, with the matched portion replaced in the output data volume by a token indicating the matching dictionary entry and information that encodes the length of the run (or runs) within the dictionary entry that match the input data volume. Further, because the dictionary search begins with a search for a match in a relatively small unit of data (i.e., the handle), reliance on near-perfect hashing (generally used in prior-art approaches that seek to match relatively large break-point delineated segments as hash uniqueness becomes crucial to algorithmic efficiency) may be entirely avoided. Additionally, in one embodiment the limited size of the handle is exploited to enable tree-based search techniques that are often impracticable when searching for a match on a larger unit of data.

Figure 1:
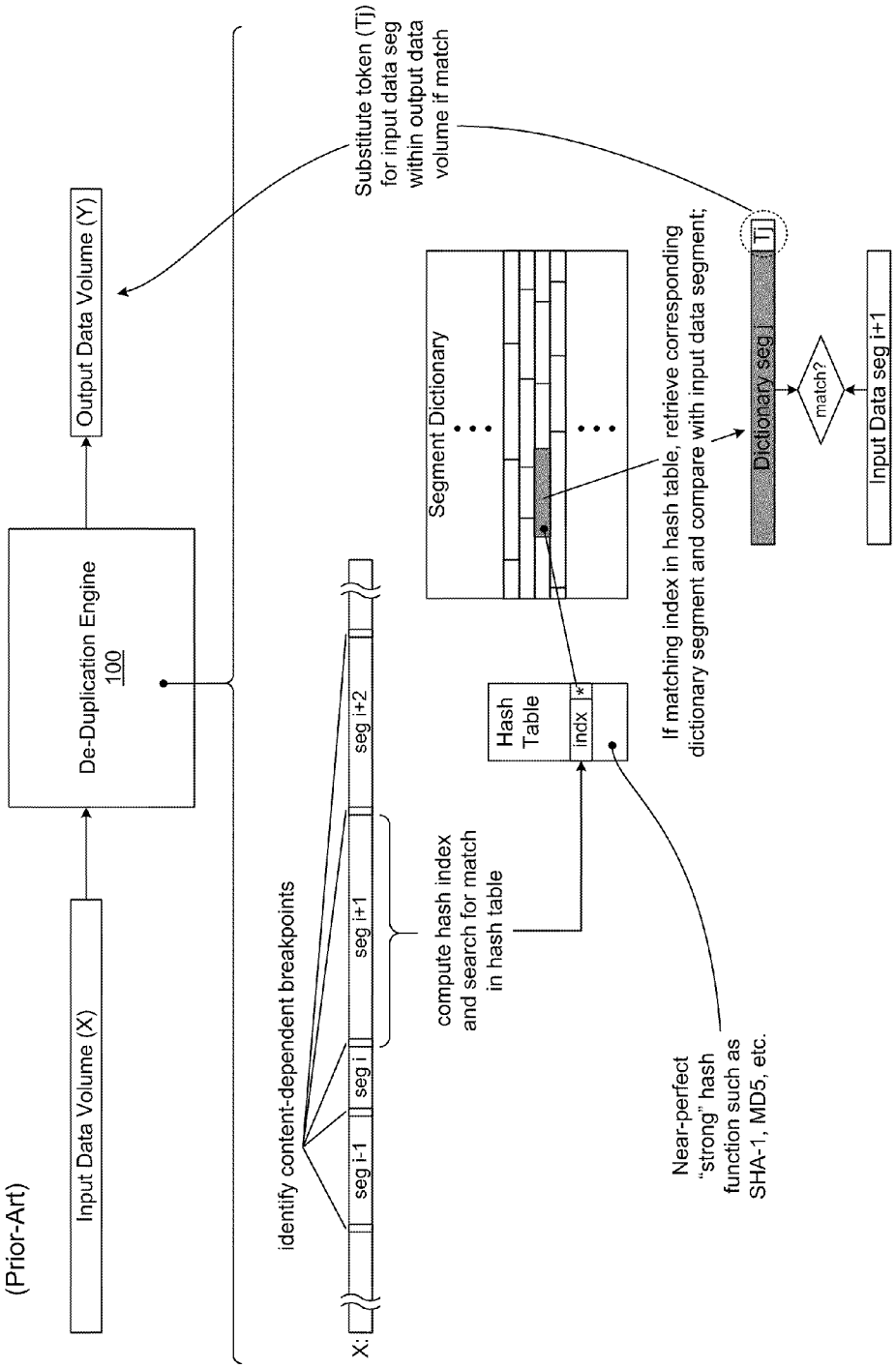
FIG. 1 illustrates a prior-art de-duplication engine.
Figure 2:
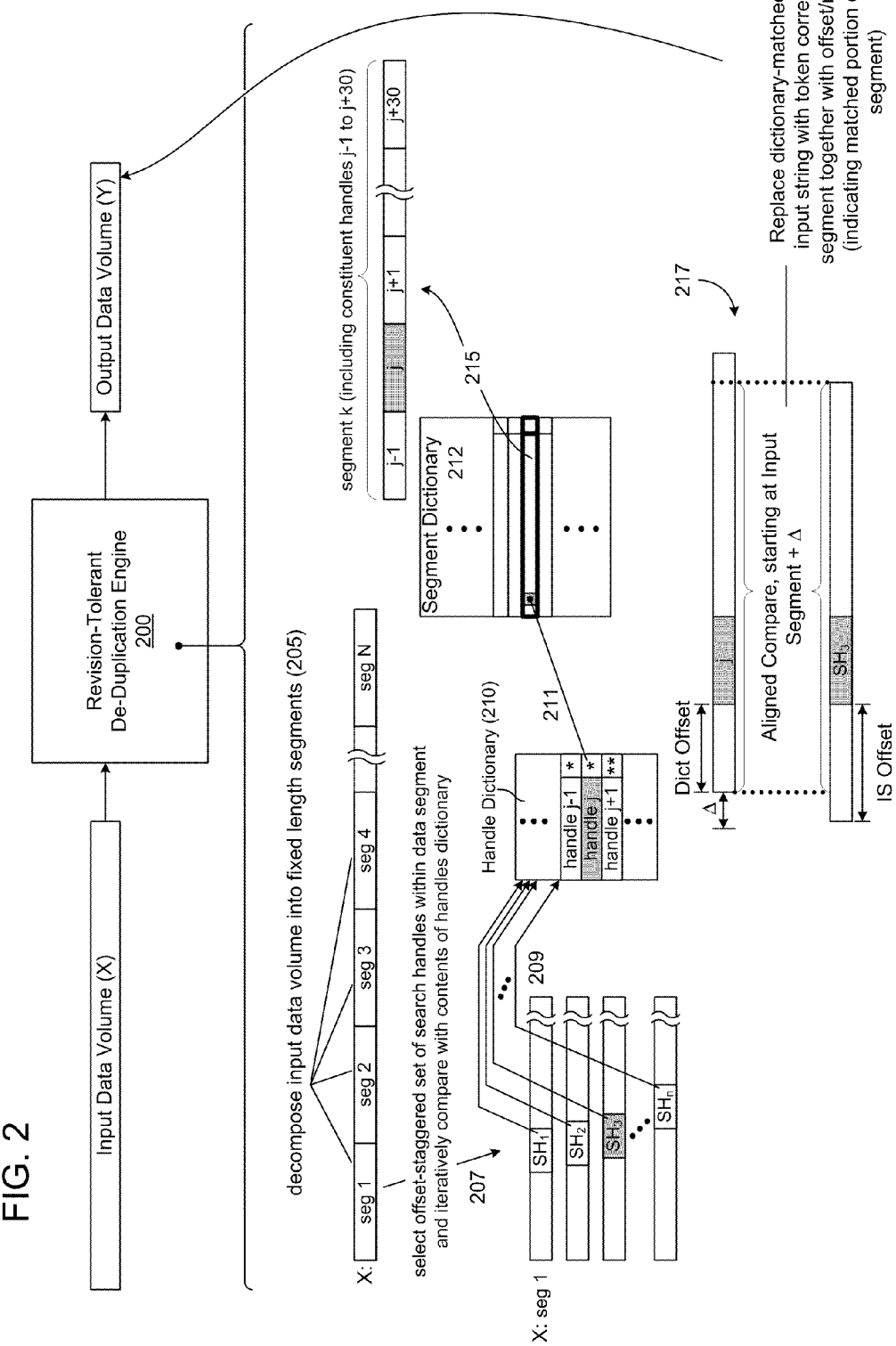
FIG. 2 illustrates an embodiment of a revision-tolerant de-duplication engine.

FIG. 2 illustrates an embodiment of a revision-tolerant de-duplication engine 200 that may be employed within a network appliance, data storage system or any other system that may benefit from reduced transfer or storage of redundant data. In the embodiment shown, the de-duplication engine 200 decomposes an input data volume X into fixed-length segments as shown at 205 and then carries out dictionary-based, revision-tolerant de-duplication with respect to each segment to produce a reduced-size output volume, Y. To enable this operation, the de-duplication engine first populates a two-part de-duplication dictionary with the contents of cold segments (i.e., segments that yield dictionary "misses"), storing each cold segment in a segment dictionary 212 (a first component of the de-duplication dictionary) and storing pointers to relatively small fixed-length subsegments of the cold segment in a segment-lookup dictionary 210 (a second component of the de-duplication dictionary). The fixed-length subsegments are referred to herein as handles and thus the segment-lookup dictionary referred to as a "handle" dictionary 210. In one embodiment, each handle is stored within the handle dictionary along with a pointer to each instance of that handle within the segment dictionary as shown at 211. Alternatively, instead of storing the handle itself within the handle dictionary, a hash value that may be deterministically computed from the handle may be used to index the pointer(s) to corresponding instances of the handle within the segment dictionary. Further, as discussed below, due to the relatively small-size of the handle, tree-based search techniques may be used to index the handle dictionary.

To search the two-part de-duplication dictionary for a given segment of input data volume X (also referred to herein as an input string), the de-duplication engine 200 selects an offset-staggered set of search handles within the data segment as shown at 207 and compares each search handle in turn (i.e., iteratively compares the search handles) with the contents of the handle dictionary as shown at 209 until either a matching handle is detected or all the search-handles are determined to miss (i.e., have no match within) the handle dictionary. In the specific example shown in FIG. 2, search handles, $SH_1$-$SH_n$, are retrieved from progressively incremented byte offsets within the first segment of the input data volume (i.e., byte-offset-staggered search handles) and compared with the contents of the handle dictionary 210 until a match is detected; in this example, a match for search handle, $SH_3$. The de-duplication engine 200 then references (or de-references) the pointer associated with the matching handle-dictionary entry (pointer '*' for handle j in this example as indicated by the shaded handle entry) to retrieve a dictionary segment (i.e., data segment from the segment dictionary) containing the search handle. For purposes of illustration, the retrieved segment 215 is assumed to contain 32 handles shown by handle indices j−1 to j+30, and the pointer itself is structured to include (or enable determination of) of the base address of the segment and the offset of the matching handle (handle j) within the retrieved dictionary segment. Because the offset of the matching handle within the dictionary segment is known (or determinable), and the offset of the search handle within the input data segment is also known (i.e., search handle $SH_3$ is offset by the starting offset of initial search handle, $SH_1$, plus the offset between $SH_3$ and $SH_1$—the starting offset of $SH_1$+2), the two segments may be bytewise aligned according to the difference between their offsets. That is, even if a data insertion has occurred at the beginning of the input data segment (or in a preceding segment) in a manner that results in a positional shift, the offset-staggered handle search will not only enable detection of matching portions of the input segment and a corresponding dictionary segment, but will enable determination of the relative offsets between those matching portions and their respective segment-start locations. Consequently, the misalignment between the input segment and dictionary segment (A) may be used to enable an aligned comparison of the two segments—a bytewise comparison of the segment contents starting at an offset within one of the segments that accounts for the misalignment between their matching handles. This operation is illustrated at 217 by the comparison of the overlapping portions of the segments after being aligned by their handles. Note that a number of bytes (i.e., those not included within the overlapping region) are excluded from the comparison according to the handle misalignment value, $\Delta$, at either end of the two segments. Further, in one embodiment, the de-duplication engine not only determines whether all the bytes of the overlapping portions of the segments match, but the specific number of matching bytes, thereby enabling an encoding and data reduction even in the event that the two overlapping segments only partially match. As discussed below, the approach described thus far may be applied recursively (potentially using progressively smaller handles) to encode multiple discontiguous matching portions of the input segment and one or more dictionary segments. Upon concluding the comparison operation at 217, the de-duplication engine encodes the match by inserting, within the output data volume, a token representative of the dictionary segment and information identifying the specific portion of the dictionary segment determined to match all or part of the input segment in place of the matched (and therefore redundant) portion of the input string. A converse operation may be applied within a recipient system (or upon data retrieval) to restore the original data in response to the segment-specifying token and segment portion identifier. Additional detail regarding the operation of the de-duplication engine of FIG. 2 and alternatives thereto are described in U.S. patent application Ser. No. 12/495,432 (filed Jun. 30, 2009 and entitled "Revision-Tolerant Data De-Duplication") which is hereby incorporated by reference in its entirety.

The sheer volume of data to be processed within the de-duplication system of FIG. 2 presents implementation challenges in both the handle-dictionary and the segment dictionary. In general, a robust implementation should be able to store very large number (hundreds of millions or more) of entries, each entry including a data pattern and one or more optional fields. For example, in an embodiment in which the maximum number of dictionary entries is fixed at 2 billion and the size of each entry is fixed at 4 kilobytes (kB) plus a 4-byte (4B) token, then the maximum dictionary size is $(4096+4)*2*10^9=8.2$ terabytes. Other entry sizes, code sizes, numbers of entries may be used, and any or all of those parameters may be changed dynamically or statically at the cost of potential reorganization.

Also, data storage within the dictionary is dynamic and generally involves insertion and deletion of large numbers (on the order of a fraction of the total number of lookups) of entries into and from the dictionary in each unit of time (each second, for example). Further, the dictionary implementation should support not only the reduction of data patterns by substituting pre-assigned code to a pattern, but also the reverse ("decompress") operation in which a code is replaced by the corresponding data pattern in the dictionary that that code is associated with.

It is also desirable that the space utilization be high in storing such a dictionary. More formally, if the sum of sizes of all entries in the dictionary is S, and the space actually used to store the dictionary and any other data structures utilized to perform operations on the dictionary is T, then it is important that the overhead measured as (T-S) be small (e.g., less than 20% of S).

Figure 3:
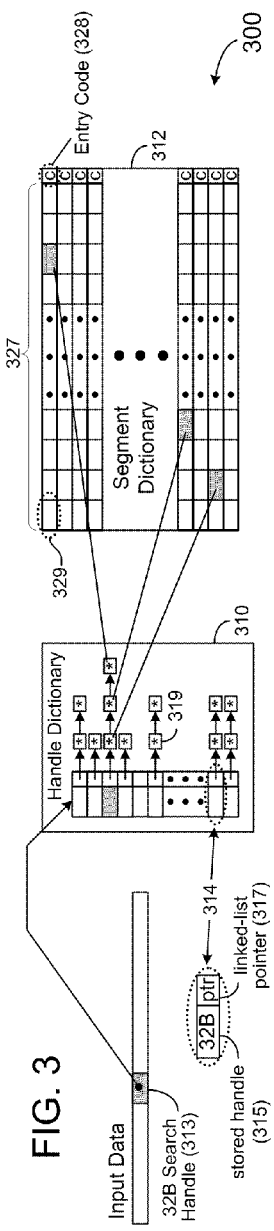
FIG. 3 illustrates a generalized embodiment of a two-part data de-duplication dictionary that may be used within the data de-duplication engine of FIG. 2.

FIG. 3 illustrates a generalized embodiment of a two-part data de-duplication dictionary 300 developed in view of the foregoing principles and including a handle dictionary 310 and segment dictionary 312. The segment dictionary is formatted to store fixed-length data patterns or segments 327 each of which is logically partitioned into multiple handles 329. For purposes of this example and examples that follow, each handle 329 (or "base segment") is assumed to be a 32-byte (32B) value and each dictionary segment is assumed to be a 4 kB (4096 bytes) having 128 constituent handles. In the embodiment of FIG. 3, each dictionary segment 327 is associated with a 4-byte (4B) entry code 328 ("C") that may be used as a token identifier for all or part of the corresponding segment 327 within an output data volume.

The handle dictionary 310 is formed by a set of handle entries 314 that correspond to respective handle values present in one or more instances in the segment dictionary. and set of one or more pointers that point to the instances of the handle in the segment dictionary. As shown, each handle entry 314 may include an explicit copy of a 32B handle 315 and pointer or other reference 317 to a linked list (or array or other structure) that itself contains pointers 319 to instances of that same handle in the segment dictionary. By this arrangement, a 32B "search handle" 313 selected from an input data volume may be compared with contents of the handle dictionary to determine whether one or more instances of the handle exists in the segment dictionary and, if so, to obtain the list of pointers 319 to the matching instances. Matching handles within the input data volume, handle dictionary and segment dictionary are shaded, for example, in FIG. 3.

As discussed above, the handle dictionary may be required to store and facilitate lookup of hundreds of millions or billions or more unique handle entries—a volume that presents challenges in terms of efficient and practicable handle dictionary implementation. For example, hardware-implemented lookup (e.g., parallel compare of an incoming search handle with handles stored within the handle dictionary using content addressable memory or the like) may be used to speed lookup in the handle dictionary in relatively small-capacity systems, but the amount of hardware required may be cost prohibitive in systems intended to store extremely large dictionaries. In those cases, a more sequential approach to the handle-lookup may be required.

Figure 4:
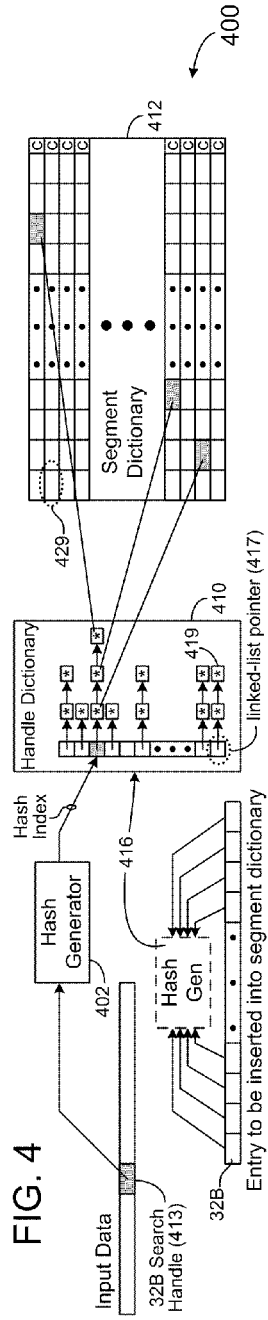
FIG. 4 illustrates an alternative embodiment of a de-duplication dictionary in which a hashing function, implemented in a hash generator, is used to match search handles with corresponding handle instances within a segment dictionary.

FIG. 4 illustrates an alternative embodiment of a de-duplication dictionary 400 in which a hashing function, implemented in a hash generator 402, is used to match search handles with corresponding handle instances within a segment dictionary 412 ("dictionary-entry handles" or "entry handles"). In this case, instead of storing an explicit instance of a given handle in handle dictionary 410, search handles 413 and entry handles 429 are associated with one another by virtue of matching hash values. More specifically, when inserting an entry into the segment dictionary 412, each of the constituent handles 429 is hashed (e.g., using the same hash function and potentially the same hash generator used in a dictionary search) to yield a hash index 416. The hash index 416 is then used to index (or address) the handle dictionary, obtain a linked-list pointer 429 corresponding to the hash index, and add a pointer 419 to the handle within the newly inserted dictionary entry to the list of pointer(s) pointed to by linked-list pointer 429. That is, the entry handles are hashed to determine their respective hash indices, and those hash indices are used to populate the handle dictionary 410 with pointers to the corresponding handles at their respective storage locations within the segment dictionary 412. By this operation, when a search handle is hashed within hash generator 402 using that same hash function (i.e., same hash function used for entry insertion), the resulting hash index may be used to obtain the pointers to entry handles that yielded that same hash index. In contrast to prior-art techniques that employ strong, compute-intensive hashing functions to hash entire dictionary entries, a relatively weak, but lightweight (i.e., quickly computable or calculable) hash function may be implemented within hash generator 402 as the handle-match implied by the matching hash indices may be relatively quickly confirmed due to the fractional size of the handle (i.e., 32B instead of 4096 bytes). That is, it is not necessary to maximize uniqueness (i.e., minimize hash collisions) between handles and hash indices as multiple different handles that yield the same hash index may be quickly distinguished by comparing the search handle to the entry handles that yielded the same hash index.

Figure 5:
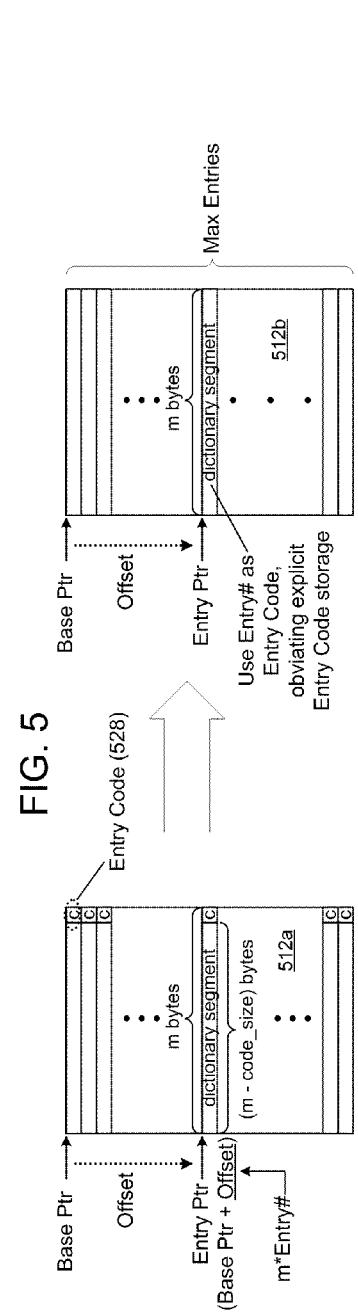
FIG. 5 illustrates an implicit code assignment technique that may be employed to improve storage efficiency within the segment dictionary and facilitate decompression of de-duplicated data streams.

FIG. 5 illustrates a technique, referred to herein as implicit code assignment, that may be employed to reduce the size of a segment dictionary (or increase the number of entries that may be stored within a storage unit having a given capacity) in any of the embodiments presented herein. More specifically, the entry codes 528 or tokens associated with respective entries of the segment dictionary 512a are implicitly assigned to those entries in alternative implementation of the segment dictionary 512b so that the codes do not occupy any space in the segment dictionary. In the embodiment of FIG. 5, this implicit code assignment is accomplished by storing segment dictionary 512*b* as a linear array of size MAX_ENTRIES, with each element of the array (i.e., each segment entry) being of m bytes. Using a base pointer ("Base Ptr") to denote the base address of the segment-dictionary array (i.e., pointing to the starting address of the first entry in the segment dictionary), then the starting address of the $n^{th}$ entry in the dictionary, for any n from 0 to MAX_ENTRIES-1, can be computed as:

Base Ptr+(m*n), where '*' denotes multiplication and the resulting address is presented in byte resolution. Because the maximum number of bytes used to store the dictionary is MAX_ENTRIES*m, it suffices to use $\log_2$(MAX_ENTRIES*m) bits to address the beginning of each dictionary entry. If the word-size, W, of a memory access is greater than a byte (e.g. 8-bytes retrieved or written in each memory access so that W=8), then the starting address of the nth entry becomes Base Ptr+((m*n)/W) and the number of bits sufficient to address the dictionary entries becomes log 2(MAX_ENTRIES*m/W). In any case, the starting address of each dictionary entry may itself be employed as the code for the pattern contained in the entry, thus avoiding the need for any explicit storage of the codes, and saving a space of at least (MAX_ENTRIES*$\log_2$ (MAX_ENTRIES*m/W)) bits. This technique has the added advantage of very efficient decompression; a code can be substituted by the corresponding data pattern simply by reading from the dictionary starting from the address given by the code value. The dictionary storage before and after this optimization appears as in shown in segment dictionaries 512*a* and 512*b*, respectively. That is, the pointer to each segment dictionary entry, "Entry Ptr," may be expressed as a sum of the base pointer, "Base Ptr," and an Offset, where the Offset is given by the product of the entry size (m) and the ordinal number of each entry within the array ("Entry#"). As shown, with explicit storage of each entry code ("Entry Code"), the storage available for each segment is reduced by the size of the code to m-code_size bytes. By contrast, when an explicit storage is used, the Entry# may be used as an implicit entry code, obviating explicit storage of the entry code and thus reducing the net storage requirement for the segment dictionary or, as shown, enabling the full m-bytes of each dictionary entry to be employed in storage of a dictionary segment (i.e., enabling storage of a larger segment). Note that instead of the entry number, the actual byte or word address (Entry#*m or Entry#*W) may be used as the implicit code associated with each entry, in effect trading a slightly larger implicit code-_size ($\log_2$(m) or $\log_2$(W)) for avoidance of address computation during the decompress operation (i.e., Entry# need not be multiplied by m or W to obtain the starting address of the entry within the decompress dictionary).

Figure 6:
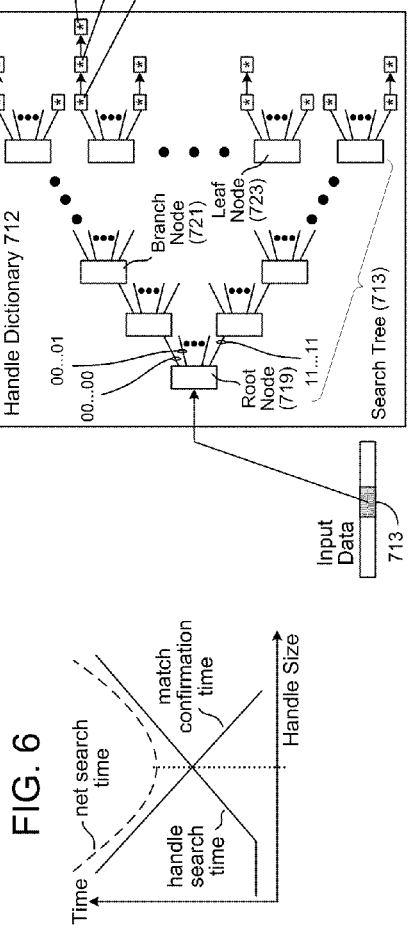
FIG. 6 illustrates a relationship between handle size and search time that may apply in de-duplication dictionary embodiments that perform match confirmation following handle-based lookup.

Reflecting on the dictionary embodiments discussed above, it should be noted that the various segment sizes and handle sizes, dictionary sizes and so forth are provided for purposes of example only and may be varied statically or dynamically according to application needs. The handle size in particular may be varied to improve the net search time in a given application and for a given hardware platform. As shown in FIG. 6, as the handle size grows, the handle search time grows (starting from a relatively constant search time up until the handle size exceeds, for example, a native data size of the underlying hardware platform) as the time required to search the handle dictionary generally grows (e.g., hardware- or software-based handle searches in accordance with FIG. 3 may need to be concatenated, adding search latency, and hash computation as in the embodiment of FIG. 4 generally grows with the size of the data being hashed, also adding latency). At the same time, a larger handle size generally reduces the likelihood of multiple instances of the same handle and thus the time required to confirm a match (e.g., by comparing the search handle and dictionary handles that correspond to the same hash index) decreases as handle size increases. Thus, considering the net search time to be a combination of the handle search time and the match confirmation time, it can be seen that the net search time may approach a theoretical relative-minimum for a given selection of the handle size. In one embodiment, the handle search time and/or match confirmation time (or merely the net search time) may be evaluated for programmatically selectable sizes of the handle to ascertain, within a given system and/or for a given dictionary size or configuration, the handle size which yields the fastest search time. Thereafter, that handle size may be programmatically specified (e.g., through selection in a software execution used to implement all or part of the de-duplication system) and employed as the handle size within the system. If the dictionary size changes beyond a given threshold or the dictionary configuration is changed, the handle size may be revised in response, with reorganization of the underlying segment and handle dictionaries as necessary to support the new handle size.

Figure 7:
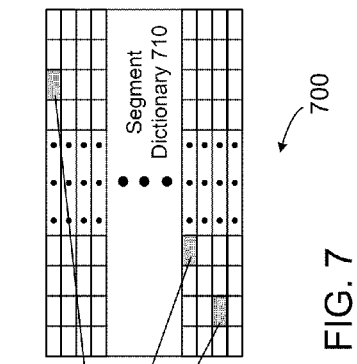
FIG. 7 illustrates an alternative embodiment of a two-part de-duplication dictionary in which the handle dictionary is implemented by a search tree instead of by explicit handle storage or hashing techniques.

FIG. 7 illustrates an embodiment of a de-duplication dictionary 700 in which the a handle dictionary 710 is implemented by a search tree 715 instead of by explicit handle storage (as in FIG. 3) or hashing techniques (as in FIG. 4). In effect, the individual handles within the segment dictionary are implicitly stored within the search tree by instantiation of corresponding branch and leaf nodes within the search tree. That is, when an entry is inserted into the segment dictionary 712, branch nodes 721 and leaf nodes 723 corresponding to each of the constituent handles of the segment are instantiated within the search tree 715. More specifically, the handle may itself be segmented into node values corresponding to respective hierarchical levels within the search tree 715, with each node value being used to indicate the branch from a given node to a node at the next hierarchical level in the search tree. Thus, considering an exemplary 32-byte handle segmented into 32 byte-sized node values, then the first node value (e.g., the least or most significant byte of the handle) may be applied to select one of 256 possible branches from a root node 719 to the branch node at the next hierarchical level. The second node value may then be applied to select one of 256 possible branches from the initial branch node to the branch node at the next hierarchical level and so forth to the final node value, which may be applied to select one of 256 possible branches from the penultimate hierarchical level (the last level of branch nodes 721) to a leaf node (a node at the last hierarchical level in the tree or from which no branches extend to other nodes). The leaf node may include a pointer to the handle being sought (e.g., a pointer to a linked list as in embodiments discussed above) in a search operation (i.e., search handle 713) or may be modified to include a pointer to a handle being added in an insertion operation.

Reflecting on the 32-byte handle/byte-sized node value example of FIG. 7, it can seen that a search tree constructed as described may include up to 256 branches at the root node 719, $256^2$ branches at the first-level of branch nodes 721 and thus up to $256^{32}$ (or $2^{256}$) branches at the hierarchical level of the leaf nodes 723. Consequently, the storage requirement for such a tree may grow quickly beyond practicable limits when applied to a voluminous de-duplication dictionary. Moreover, even for modestly sized de-duplication dictionaries, as many as 32 branches may need to be followed to obtain the pointer list for a given search handle 713, thus yielding a relatively long-latency search (and similarly a relatively slow insertion action as the search tree is traversed during handle insertion to enable addition of any as-yet non-instantiated branch and leaf nodes corresponding to the handle).

Figure 8:
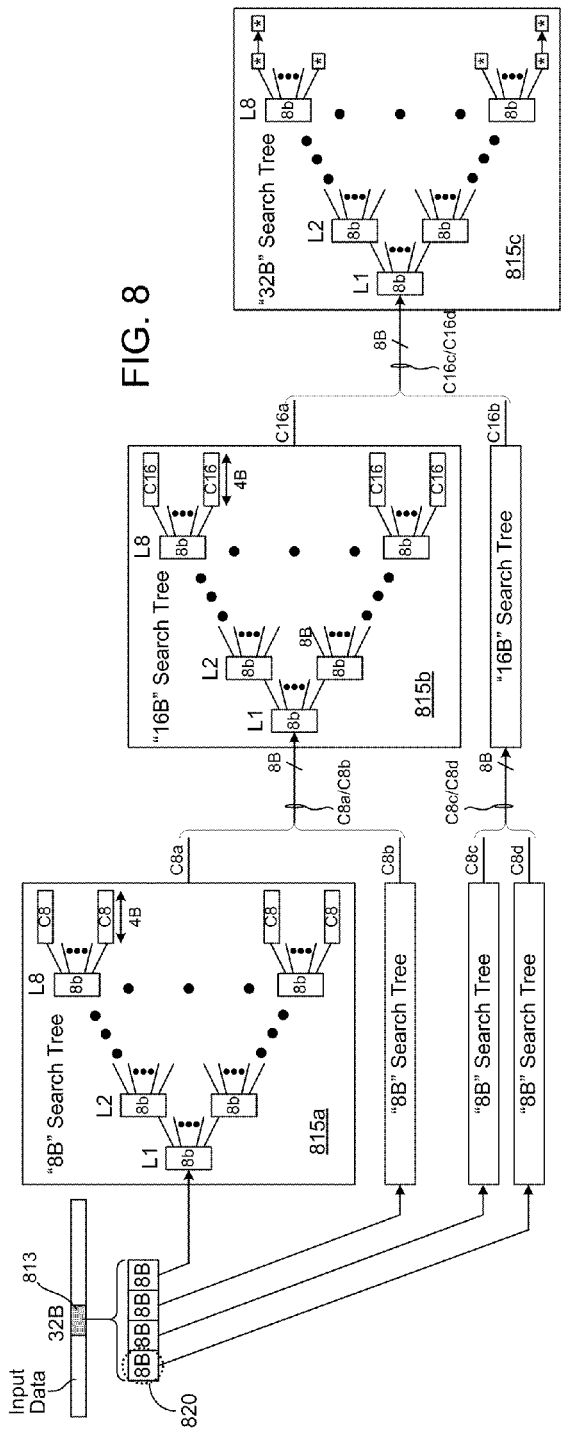
FIG. 8 illustrates an embodiment of a handle dictionary having hierarchically coupled search trees.

In an alternative embodiment, illustrated in FIG. 8, both the storage requirement and the latency of a tree-based handle dictionary are reduced by decomposing the monolithic search tree of FIG. 7 into a hierarchically ordered set of smaller search trees 815a, 815b, 815c that may be searched in succession (canonically) using relatively small sub-components of the handle. In the specific embodiment shown, for example, a 32-byte search handle 813 is decomposed into four 8-byte (64-bit) search values, referred to herein as handle components 820, that are applied sequentially or in parallel within an "8-byte" search tree 815a ("8B-Tree"). The leaf nodes of the 8-byte search tree are composed of four-byte (32-bit) codes, "C8," that enable representation of up to 4 billion distinct search words. Thus, if a given handle component matches a counterpart handle component within the segment dictionary (i.e., a "hit occurs within the tree), a corresponding C8 code corresponding to the handle component will be returned by the search in tree 815a. Otherwise, a "miss" will be signaled for the missing handle component. As a match for the overall search handle 813 requires that each of the handle components 820 be present in the segment dictionary (and thus in the 8B-Tree 815a), a miss on any one of the handle components 820 may be construed as a miss for the overall 32B search handle 813.

Assuming that a hit occurs for each of the four handle-components 820, the four resulting C8 codes are organized into two paired code sets in which the two 4-byte codes of a given pair are concatenated to synthesize a new 8-byte search value. Thus, as shown in FIG. 8, 4-byte codes C8a and C8b (resulting from respective searches in tree 815a) are concatenated to yield a synthesized 8-byte search value C8a/C8b, and codes C8c and C8d are similarly concatenated to yield a synthesized 8-byte search value, C8c/C8d. The two synthesized search values resulting from the search in the 8B-Tree are applied sequentially or in parallel to a "16-byte" Search Tree 815b which may be constructed and searched in generally the same manner as the 8B-Tree 815a. That is, the designation "16 byte" refers to the contents of the tree and not its number of hierarchical levels nor the size of the value applied.

As with the search in the 8B-Tree, a miss for either of the two synthesized search words within the 16B-Tree 815b indicates a miss for the overall handle 813. Otherwise, if the two valid "C16" codes (e.g., C16a and C16b) are returned by the pair of 16B-Tree searches, then both of the handle-component pairs are present in the segment dictionary. Accordingly, a final 8-byte search word may be synthesized by concatenating the C16 codes (e.g., forming C16a/C16b as shown), and the final search word is applied to a "32-byte" Search Tree 815c which may be constructed and searched in generally the same manner as the 16B-Tree and 8B-Tree. That is, the tree is traversed using constituent bits of the search word (constituent sets of 8 bits (8b) in the example shown) to determine whether a leaf node corresponding to the synthesized search value exists. If so, a "hit" for synthesized search value is confirmed in the 32B-Tree and thus a hit in the hierarchy of search trees is confirmed for the overall 32B search handle 813. If a hit occurs, a pointer in the leaf node of the 32B-Tree may be referenced (or de-referenced) to obtain one or more pointers to corresponding handles in the segment dictionary as discussed above. In contrast to the hash-based approach however, no match confirmation need be performed, as the bits of the search handle are effectively confirmed to match the bits of the dictionary handles by virtue of their matched paths through the hierarchical search trees.

As alluded to above, the traversal of each of the 8B-, 16B- and 32B-Trees may be effected by proceeding node to node (starting at a root node and ending at a leaf node, if present) applying a respective set of bits within the search value to transition from one hierarchical level to the next. In the particular example shown, the set of bits evaluated in the branch to from one hierarchical level to the next is a byte-sized (8-bit) value so that a total of eight hierarchical levels (L1, L2, . . . , L8) are traversed from root node to leaf node. In alternative embodiments, different numbers of bits may be evaluated at any or all of the hierarchical levels (including asymmetric numbers of bits at respective levels such that the number of bits evaluated to determine the branch from, say, the root node at hierarchical level 1 ("L1"), is different from the number of bits evaluated to determine the branch from any or all of the branch node levels (L2 to L7). Similarly, the total number of search trees in the hierarchy, the number of handle components searched, etc. may be varied in alternative embodiments.

Reflecting on the operation of the hierarchical search tree embodiment of FIG. 8, it can be observed that only 24 branches are required to progress from the root node of the 8B-Tree 815a to a leaf node in the 32B-Tree 815c as opposed to the 32 branches required in the singular-search-tree embodiment of FIG. 7 for the same 32B search handle. Further, each of the three search trees 815a-815c in the hierarchical embodiment requires substantially less storage overhead due, for example, to the smaller size of each of the branch pointers (64 bit branch pointers instead of 256 bit branch pointers). Note that, because the multiple-searches within the 8B-Tree are applied, in effect, to the same data state, a single instance of the 8B-Tree may be used for all 8B searches (i.e., the multiple instances of the 8B-Tree are not required and are shown in FIG. 8 only to explicitly show the retrieval of multiple C8 codes (i.e., C8a, C8b, C8c and C8d). The same is true of the 16B-Tree; only a singular instance is required. Further, because the handle component searches within the 8B-Tree (and the synthesized-search-value searches within the 16B-Tree) may be carried out in parallel, the net time required for tree traversal may be reduced relative to that of the singular-tree-search. Also, the decomposition of the search activity into a set of searches in hierarchical trees naturally lends itself to a pipelined embodiment in which a search for one handle is being concluded in a 32B-Tree search in concurrently with a 16B-Tree search for another handle, and an 8B-Tree search for yet another handle. In a subsequent tree search interval, the results of the 16B-Tree search are applied to the 32B-Tree (if necessary), the results of the 8B-Tree search are applied to the 16B-Tree (if necessary) and the components of a new handle are applied to the 32B-Tree. Even finer granularity pipeline stages (e.g., corresponding to the hierarchical levels or groups of hierarchical levels within any or all of the search trees) may be employed in alternative embodiments.

Figure 9:
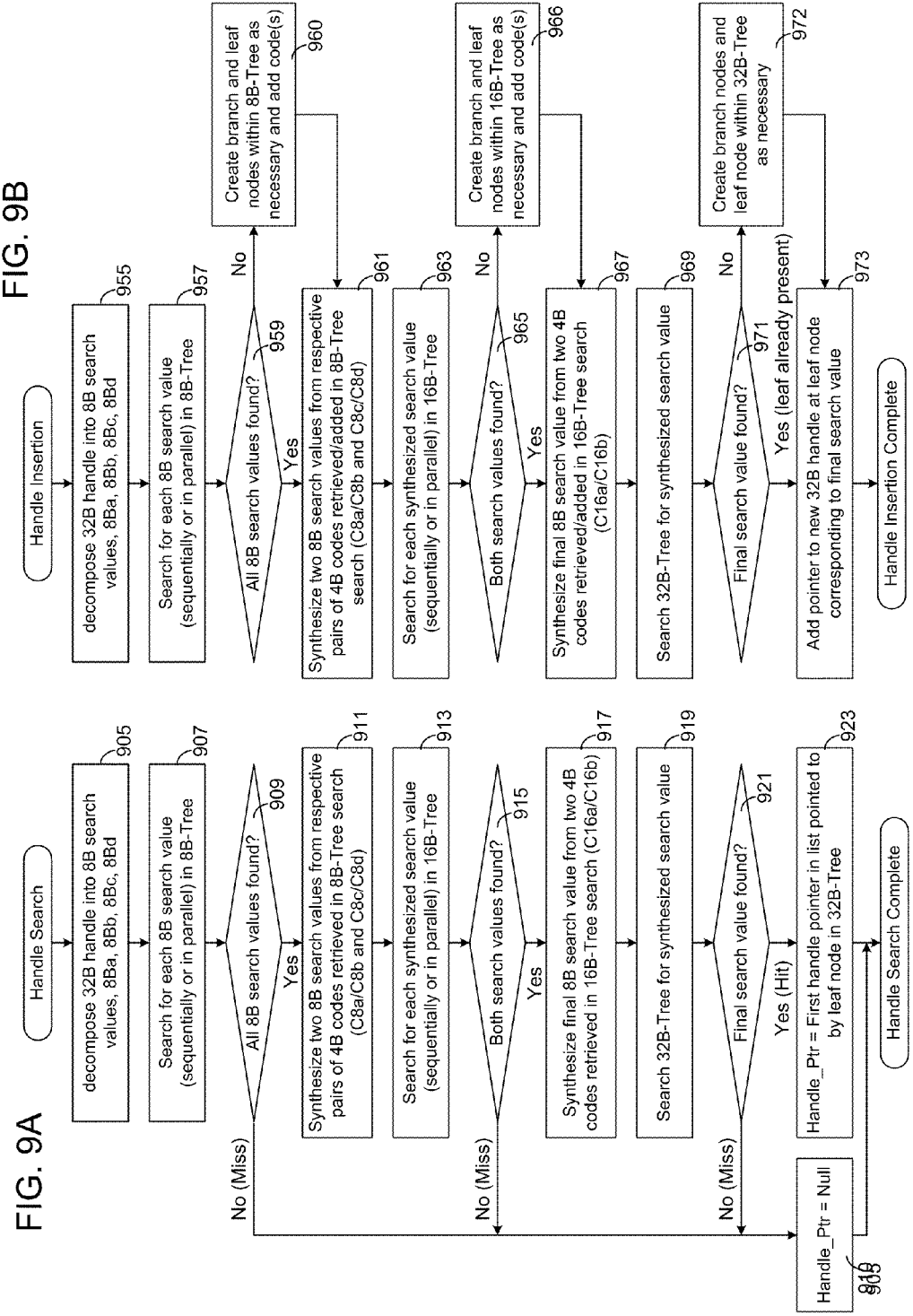
FIGS. 9A and 9B present exemplary flow diagrams for a handle search and handle insertion, respectively, within the hierarchical search tree embodiment of FIG. 8.

FIGS. 9A and 9B present exemplary flow diagrams for a handle search and handle insertion, respectively, within the hierarchical search tree embodiment of FIG. 8. Starting with a handle search operation (FIG. 9A), at 905 a 32B search handle is decomposed into 8B search values (handle components). At 907, the 8B-Tree is searched for each 8B search value either sequentially or in parallel. If all the 8B search values are found (e.g., correspond to leaf nodes) within the 8B-Tree (as determined in decision 909), then the overall 32-byte (32B) search handle is deemed to hit the 8B-Tree. Otherwise, the 32B handle is deemed to miss the dictionary and a null pointer is assigned to a handle pointer (Handle_Ptr) as shown at 910. If the handle hits the 8B-Tree, then at 911, two new 8B search values are synthesized by concatenating respective pairs of the four 4B codes produced in the 8B-Tree hit. The 16B-Tree is searched for each of the two synthesized search values in 913. If both synthesized search values are found in the 16B tree (i.e., a 16B-Tree hit as determined at 915), the resulting codes from the 16B table are concatenated to synthesize a final 8B search value (as shown at 917) which is, in turn, searched for within the 32B-Tree as shown at 919. If the final 8B search value is found (determined at 921), then the overall handle is deemed to hit the handle dictionary, and at 923 the handle pointer is assigned the value of the first handle pointer in the list pointed to by the search-specified leaf node in the 32B-Tree. At this point the handle pointer may be returned to enable the dictionary segments pointed to by each handle in the linked list to be retrieved and compared with the input data segment as discussed above. If the returned handle pointer indicates a dictionary miss (i.e., Handle_Ptr is null), the de-duplication system may determine alternative actions including, but not limited to, searching the handles dictionary for one or more additional handles selected from the input data segment or inserting the input data segment (and its constituent handles) within the segment dictionary and handles dictionary.

In an embodiment as shown in FIG. 8, insertion of an input data segment into the segment and handles dictionary may be effected by searching the handles dictionary for each of the constituent handles of the data segment being inserted and adding branch and leaf nodes within the hierarchical search trees as necessary to ensure that a subsequent search of that same handle will yield a hit (and a pointer to the handle within the data segment being inserted). The flow diagram of FIG. 9A illustrates an exemplary approach for such handle insertion. As shown, at 955 a 32B search handle is decomposed into 8B search values (handle components) and at 957, the 8B-Tree is searched for each 8B search value either sequentially or in parallel. If all the 8B search values are found (e.g., correspond to leaf nodes) within the 8B-Tree (as determined in decision 959), then the overall 32B handle is deemed to hit the 8B-Tree. Otherwise, the 32B handle is deemed to miss the dictionary so that, at 960, the missing branch and leaf nodes corresponding to handle component(s) that yielded the miss are added to the 8B-Tree, and a corresponding C8 code is added for each added leaf node. A determination that a handle misses the 8B-Tree logically dictates (or indicates) a miss determination for all downstream search trees. And yet, while no further search of the downstream trees is required following a miss in the 8B-Tree, such searches may nonetheless be carried out to determine what specific branches and leaf node (s) need to be added to the 16B tree (though various optimizations may be carried out in view of the fact that a miss is known in advance). Accordingly, in one embodiment, after detecting a hit within the 8B search tree at 959, or following branch/leaf instantiation after a miss in the 8B search tree (at 960), two new 8B search values are synthesized by concatenating respective pairs of the four 4B codes produced in the 8B-Tree hit (or added following the miss) at 961. The 16B-Tree is then searched for each of the two synthesized search values at 963. If both synthesized search values are found in the 16B tree (i.e., a 16B-Tree hit as determined at 965), the resulting codes from the 16B table are concatenated to synthesize a final 8B search value (as shown at 967) which is, in turn, searched for within the 32B-Tree as shown at 969. If a miss occurs in the 16B-Tree, then new branch/leaf nodes are established within the 16B-Tree as necessary (as shown at 969), with corresponding new code(s) added and applied in the 32B-Tree search. Similarly, if a miss occurs within the 32B-Tree (determined at 971), new branch nodes and a new leaf node are added as necessary at 972 to reflect the synthesized 8B search value. Finally, at pointer to the new 32B handle is added at the leaf node reached or added in association with the final search value at 973.

Figure 10:
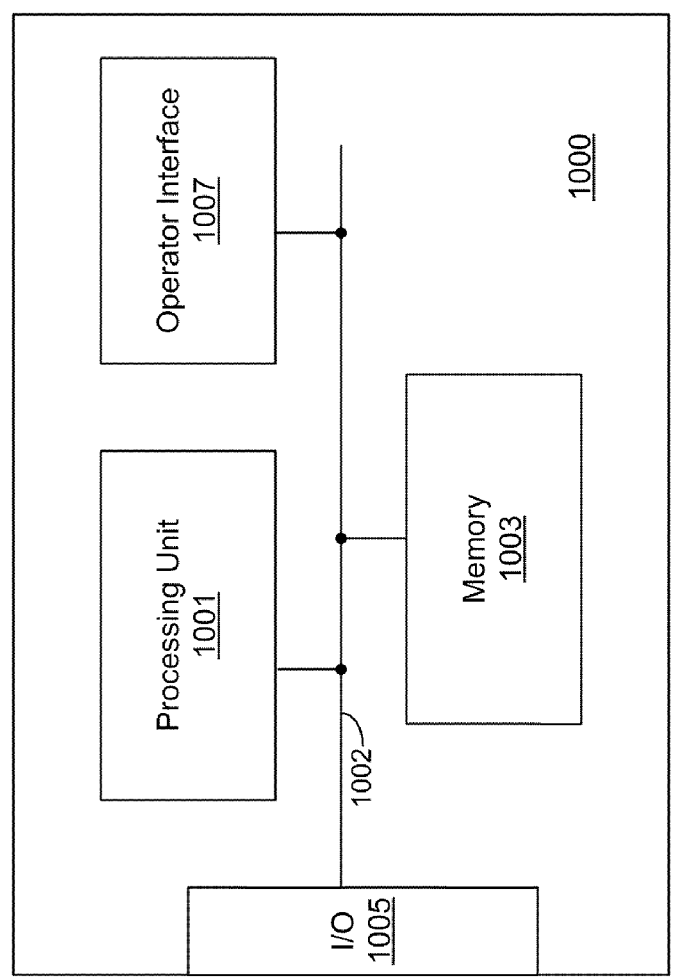
FIG. 10 illustrates a generalized embodiment of an appliance (or system or device) for executing the de-duplication operations described in reference to FIG. 2 and in which the dictionary architectures described in reference to FIGS. 3-9 may be implemented.

FIG. 10 illustrates a generalized embodiment of an appliance 1000 (or system or device) for executing the de-duplication operations described above and in which the above-described dictionary architectures may be implemented. As shown, the appliance 1000 includes a processing unit 1001 formed by one or more general purposes or special purpose processors, memory 1003 for storing program code executed by the processing unit to effect the various architectures, methods and techniques of the above-described embodiments, and also to store the data streamed through the appliance (i.e., input and output data volumes or portions thereof).

The appliance further includes one or more input and/or output (I/O) ports 1005 for receiving and outputting the data stream, and a user interface 1007 to present and receive information to a human or artificial operator and thus enable operator control of the de-duplication function (e.g., set configuration, programmable values, etc.) as well as to interact with the appliance in a manner intended by its core function. Though not shown, numerous other functional blocks may be provided within the appliance according to its core function (and the appliance itself may be a component in a larger host appliance or network of appliances). Further, the functional blocks are depicted as being coupled by a communication path 1002 which may include any number of shared or dedicated buses or signaling links. More generally, the functional blocks shown may be interconnected in a variety of different architectures and individually be implemented by a variety of different underlying technologies and architectures. With regard to the memory architecture, for example, multiple different classes of storage may be provided within memory 1003 to store different classes of data. For example, non-volatile storage media such as fixed or removable magnetic, optical, or semiconductor-based recording media may be provided to store executable code and related data (or receivable within such system to enable receipt of such executable code and related data), while volatile storage media such as static or dynamic RAM for storing variable data.

The various dictionary architectures and related de-duplication methods and techniques disclosed herein may be implemented in whole or part through execution of one or more a sequences of instructions (i.e., software program(s)) within the processing unit 1001, or by a custom-built hardware ASIC (application-specific integrated circuit), or programmed on a programmable hardware device such as an FPGA (field-programmable gate array), or any combination thereof. If a purely hardware-based execution engine is provided, the processing unit 1001 and related circuitry may be omitted from appliance 1000.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 6. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be buses. Signals and signaling paths shown or described as being single-ended may also be differential, and vice-versa. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of de-duplicating a volume of data, the method comprising:
    partitioning the volume of data into input segments;
    for each of the input segments, traversing nodes of a search tree in accordance with the value of a fixed-size portion of the input segment to determine if the search tree contains a pointer to a matching fixed-sized portion of a segment within a dictionary;
    if the search tree contains the pointer:
        comparing the input segment with the segment within the dictionary pointed to by the pointer; and
        substituting a token representative of the segment within the dictionary for at least part of the input segment determined to match the segment within the dictionary; and
    constructing the search tree based on fixed-size portions of multiple segments within the dictionary, wherein the search tree comprises at least a first search tree and a second search tree, and wherein adding branch nodes and leaf nodes within the search tree comprises:
        adding branch and leaf nodes within the first search tree corresponding to the fixed-size portions of data;
        associating respective code values with the leaf nodes within the first search tree;
        concatenating at least two of the code values to generate a synthesized value; and
        adding one or more branch nodes and a leaf node within the second search tree corresponding the synthesized value.

2. The method of claim 1 wherein constructing the search tree based on fixed-size portions of multiple segments within the dictionary comprises, for at least a first segment of the multiple segments, logically subdividing the first segment into fixed-size units of data and adding branch nodes and leaf nodes within the search tree corresponding to the fixed-size units of data, wherein the fixed-size units of data are the same size as the fixed-size portion of the input segment.

3. The method of claim 1 wherein traversing the nodes of a search tree comprises traversing the nodes of a first search tree to obtain a plurality of codes that correspond respectively to a plurality of units of data within the fixed-size portion of data.

4. The method of claim 3 wherein traversing the nodes of a search tree further comprises concatenating at least two of the codes that correspond to the plurality of units of data to synthesize a first search value and traversing the nodes of a second search tree to obtain a value that indicates a storage location of the matching fixed-size portion of the segment within the dictionary.

5. The method of claim 4 wherein traversing the nodes of a second tree to obtain a value that indicates a storage location of the matching fixed-size portion of the segment within the dictionary comprises traversing the nodes of the second tree to obtain an additional plurality of codes that correspond to plurality of units of data.

6. The method of claim 5 wherein traversing the nodes of a second tree to obtain a value that indicates a storage location of the matching fixed-size portion of the segment within the dictionary further comprises concatenating at least two codes of the additional plurality of codes to synthesize a second search value and traversing the nodes of a third search tree to obtain the value that indicates the storage location of the matching fixed-size portion of the segment within the dictionary.

7. The method of claim 6 wherein traversing the nodes of a third search tree to obtain the value that indicates the storage location of the matching fixed-size portion of the segment within the dictionary comprises traversing the nodes of the third search tree to obtain a list of one or more pointers, the list of one or more pointers including a pointer that indicates the storage location of the matching fixed-size portion of the segment within the dictionary.

8. The method of claim 7 wherein each of the first, second and third search trees each comprise a root node that points to a plurality of branch nodes, and wherein the root node within each of the first, second and third trees has the same number of maximum possible pointers to branch nodes.

9. The method of claim 3 wherein the nodes of the first search tree comprise a root node that points to a plurality of branch nodes and wherein the root node and each of the plurality of branch nodes have the same number of maximum possible pointers to nodes within the first search tree.

10. A data de-duplication apparatus comprising:
segmentation logic to partition a volume of data into input segments;
a storage component to store segments of data within a dictionary; and de-duplication logic to instantiate a search tree corresponding to the segments of data stored within the dictionary, and wherein, for each of the input segments, the de-duplication logic is adapted to traverse nodes of the search tree in accordance with the value of a fixed-size portion of the input segment to determine if the search tree contains a pointer to a matching fixed-sized portion of one of the segments of data within the dictionary, and, if the search tree contains the pointer, to compare the input segment with the segment within the dictionary pointed to by the pointer and to substitute a token representative of the segment within the dictionary for at least part of the input segment determined to match the segment within the dictionary, wherein the de-duplication logic to instantiate the search tree includes logic to instantiate the search tree based on fixed-size portions of the segments of data within the dictionary, the search tree including at least a first search tree and a second search tree, and wherein the logic to instantiate the search tree based on fixed-size portions of the segments of data within the dictionary includes logic to (i) add branch nodes and leaf nodes within the search tree corresponding to the fixed-size portions of the segments of data, (ii) associate respective code values with the leaf nodes within the first search tree, (iii) concatenate at least two of the code values to generate a synthesized value, and (iv) add one or more branch nodes and a leaf node within the second search tree corresponding to the synthesized value, and wherein the de-duplication logic is implemented at least in part by at least one of a programmed processor, application-specific integrated circuit (ASIC), or programmable gate array.

11. The data de-duplication apparatus of claim 10 wherein the de-duplication dictionary logic adapted to traverse the nodes of the search tree comprises logic to traverse the nodes of the first search tree to obtain a plurality of codes that correspond respectively to a plurality of units of data within the fixed-size portion of the input segment.

12. The data de-duplication apparatus of claim 11 wherein the logic to traverse the nodes of the search tree further comprises logic to concatenate at least two of the codes that correspond to the plurality of units of data within the fixed-size portion of the input segment to synthesize a first search value and to traverse the nodes of the second search tree to obtain a value that indicates a storage location of the matching fixed-size portion of the one of the segments of data within the dictionary.

13. The data de-duplication apparatus of claim 12 wherein the logic to traverse the nodes of the second tree to obtain the value that indicates the storage location of the matching fixed-size portions of the one of the segments of data within the dictionary comprises logic to traverse the nodes of the second tree to obtain an additional plurality of codes that correspond to another plurality of units of data.

14. The data de-duplication apparatus of claim 13 wherein the logic to traverse the nodes of the second tree to obtain the value that indicates the storage location of the matching fixed-size portions of the one of the segments of data within the dictionary further comprises logic to concatenate at least two codes of the additional plurality of codes to synthesize a second search value and logic to traverse the nodes of a third search tree to obtain the value that indicates the storage location of the matching fixed-size portion of the one of the segments of data within the dictionary.

15. The data de-duplication apparatus of claim 14 wherein the logic to traverse the nodes of the third search tree to obtain the value that indicates the storage location of the matching fixed-size portion of the one of the segments of data within the dictionary comprises logic to traverse the nodes of the third search tree to obtain a list of one or more pointers, the list of one or more pointers including a pointer that indicates the storage location of the matching fixed-size portion of the one of the segments of data within the dictionary.

16. The data de-duplication apparatus of claim 15 wherein each of the first, second and third search trees each comprise a root node that points to a plurality of branch nodes, and wherein the root node within each of the first, second and third trees has the same number of maximum possible pointers to branch nodes.

17. A data de-duplication apparatus comprising:
means for partitioning the volume of data into a plurality of input segments;
means for storing segments of data within a dictionary;
means for traversing nodes of a search tree in accordance with the value of a fixed-size portion of each input segment of the plurality of input segments to determine if the search tree contains a pointer to a matching fixed-sized portion of one of the segments of data within the dictionary;
means for comparing the input segment with the one of the segments of data within the dictionary pointed to by the pointer if the search tree contains the pointer;
means for substituting a token representative of the one of the segments of data within the dictionary for at least part of the input segment determined to match the one of the segments of data within the dictionary if the search tree contains the pointer; and
means for instantiating the search tree based on fixed-size portions of the segments of data within the dictionary, the search tree including at least a first search tree and a second search tree, and wherein the means for instantiating the search tree based on fixed-size portions of the segments of data within the dictionary includes (i) means for adding branch nodes and leaf nodes within the search tree corresponding to the fixed-size portions of the segments of data, (ii) means for associating respective code values with the leaf nodes within the first search tree, (iii) means for concatenating at least two of the code values to generate a synthesized value, and (iv) means for adding one or more branch nodes and a leaf node within the second search tree corresponding to the synthesized value.

18. A computer-readable storage medium having one or more sequences of instructions embodied therein which, when executed by a processing unit, cause the processing unit to:
partition a volume of data into a plurality of input segments;
store segments of data within a dictionary
traverse nodes of a search tree in accordance with the value of a fixed-size portion of each input segment of the plurality input segments to determine if the search tree contains a pointer to a matching fixed-sized portion of one of the segments of data within the dictionary;

compare the input segment with the one of the segments of data within the dictionary pointed to by the pointer if the search tree contains the pointer;

substitute a token representative of the one of the segments of data within the dictionary for at least part of the input segment determined to match the one of the segments of data within the dictionary if the search tree contains the pointer; and instantiate the search tree based on fixed-size portions of the segments of data within the dictionary, the search tree including at least a first search tree and a second search tree, and wherein the one or more sequences of instructions that cause the processing unit to instantiate the search tree based on fixed-size portions of the segments of data within the dictionary include one or more sequences of instructions that cause the processing unit to (i) add branch nodes and leaf nodes within the search tree corresponding to the fixed-size portions of the segments of data, (ii) associate respective code values with the leaf nodes within the first search tree, (iii) concatenate at least two of the code values to generate a synthesized value, and (iv) add one or more branch nodes and a leaf node within the second search tree corresponding to the synthesized value.

\* \* \* \* \*